United States Patent
Bower, III et al.

(10) Patent No.: US 12,493,510 B2
(45) Date of Patent: Dec. 9, 2025

(54) TRANSMITTING A SERVICE REPORT FROM AN AIR-GAPPED COMPUTING SYSTEM

(71) Applicant: Lenovo Enterprise Solutions (Singapore) Pte Ltd., Singapore (SG)

(72) Inventors: Fred Allison Bower, III, Durham, NC (US); Jarrod B Johnson, Raleigh, NC (US); Shyam S Sareen, Cary, NC (US)

( * ) Notice: Subject to any disclaimer, the term of this patent is extended or adjusted under 35 U.S.C. 154(b) by 0 days.

(21) Appl. No.: 18/398,525

(22) Filed: Dec. 28, 2023

(65) Prior Publication Data

US 2025/0217223 A1    Jul. 3, 2025

(51) Int. Cl.
| | |
|---|---|
| G06F 11/00 | (2006.01) |
| G06F 11/07 | (2006.01) |
| H04L 9/40 | (2022.01) |
| H04W 84/12 | (2009.01) |

(52) U.S. Cl.
CPC ...... *G06F 11/0784* (2013.01); *H04L 63/0209* (2013.01); *H04L 63/0442* (2013.01); *H04W 84/12* (2013.01)

(58) Field of Classification Search
CPC ............. G06F 11/0766; G06F 11/0772; G06F 11/0784; G06F 11/3055; G06F 11/3065; H04L 63/0209
See application file for complete search history.

(56) References Cited

U.S. PATENT DOCUMENTS

| | | | | |
|---|---|---|---|---|
| 11,032,131 | B1* | 6/2021 | Franceschetti | G06F 21/606 |
| 11,954,211 | B2* | 4/2024 | Wolf | G06F 21/105 |
| 12,003,709 | B1* | 6/2024 | Geiselhart | H04N 19/115 |
| 12,106,176 | B2* | 10/2024 | Sapir | G06F 21/44 |
| 2011/0123039 | A1* | 5/2011 | Hirschfeld | H04B 1/082 |
| | | | | 381/86 |

(Continued)

OTHER PUBLICATIONS

Monitoring and Alerts from Air Gapped Networks? How do we do it?, 2021, Reddit, https://www.reddit.com/r/sysadmin/ptz0ck/monitoring_and_alerts_from_air_gapped_networks/?rdt-50168 (Year: 2021).*

(Continued)

*Primary Examiner* — Marc Duncan
(74) *Attorney, Agent, or Firm* — Jeffrey L. Streets

(57) ABSTRACT

A method includes a node detecting that a service event has occurred within the node, wherein the node is located within an air-gapped computing system that includes a plurality of nodes, and wherein there is no wired communication connection between any device within the air-gapped computing system and any device outside the air-gapped computing system. The method further includes a wireless transceiver located within the air-gapped computing system transmitting a service report in a short-range wireless communication signal that extends beyond the air-gapped computing system, wherein the service report identifies the service event detected by the node. Still further, the method includes a relay device located outside the air-gapped computing system receiving the short-range wireless communication signal that includes the service report, and the relay device forwarding the service report to a destination node located outside the air-gapped computing system.

20 Claims, 5 Drawing Sheets

(56) References Cited

U.S. PATENT DOCUMENTS

| | | | |
|---|---|---|---|
| 2016/0011921 A1* | 1/2016 | Rao | G06F 11/079 714/37 |
| 2016/0241583 A1* | 8/2016 | Kowalczyk | H04L 63/20 |
| 2021/0224212 A1* | 7/2021 | Gancarz | G06F 21/85 |
| 2023/0252169 A1* | 8/2023 | Savir | H04L 9/0825 726/26 |

OTHER PUBLICATIONS

O'Malley, Samuel Joseph and Kim-Kwang Raymond Choo, Bridging the Air Gap: Inaudible Data Exfiltration by Insiders, 2014, Americas Conference on Information System (Year: 2014).*

* cited by examiner

TRANSMITTING A SERVICE REPORT FROM AN AIR-GAPPED COMPUTING SYSTEM

BACKGROUND

The present disclosure relates to systems and methods for handling a service event that is detected by a node within an air-gapped computing system.

BACKGROUND OF THE RELATED ART

Computer security is the protection of a computer system or network from attacks by malicious actors that may result in unauthorized disclosure of information, damage to hardware or software, or disruption or misdirection of the services being provided. There are various types of attacks that can be directed against a computer system to take advantage of a vulnerability in the design, implementation, operation or internal control of the computer system. Accordingly, computer security may implement one or more security measures to reduce or eliminate the harm that can be caused by an attack.

However, a computer system that performs workloads that are highly sensitive or confidential may be installed on a fully private network, completely separate from the Internet or other networks. A computer system that is isolated in this manner may be referred to as being "air-gapped". In some instances, an air-gapped computing system may also be physically isolated from other equipment and/or from unauthorized personnel. Accordingly, an air-gapped computing system is not vulnerable to many of the attacks of a similar computing system that is connected to an external network, such as the Internet.

Even the nodes within an air-gapped computing system may be subject to a hardware or software service event. For example, a service event may be a CPU thermal event (overheating), memory correctable and uncorrectable error, application fault, kernel panic, Windows blue screen, VMWare purple screen, voltage fault, overheating of another thermal sensor, PCI error, and/or bus error. For an air-gapped computing system, a service event may be handled by a management node within the air-gapped computing system. Alternatively, a person with sufficient security credentials may manually connect a trusted device to the air-gapped computing system to collect data regarding the service event, then take the trusted device out of the air-gapped computing system to perform an analysis of the data.

BRIEF SUMMARY

Some embodiments provide a method comprising a node detecting that a service event has occurred within the node, wherein the node is located within an air-gapped computing system that includes a plurality of nodes, and wherein there is no wired communication connection between any device within the air-gapped computing system and any device outside the air-gapped computing system. The method further comprises a wireless transceiver located within the air-gapped computing system transmitting a service report in a short-range wireless communication signal that extends beyond the air-gapped computing system, wherein the service report identifies the service event detected by the node. Still further, the method comprises a relay device located outside the air-gapped computing system receiving the short-range wireless communication signal that includes the service report, and the relay device forwarding the service report to a destination node located outside the air-gapped computing system.

Some embodiments provide a system comprising a plurality of nodes located within an air-gapped computing system. The system further comprises a first short-range wireless transceiver located within the air-gapped computing system and connected for communication with the plurality of nodes, wherein the first wireless transceiver transmits short-range wireless communication signals that extend beyond the air-gapped computing system. A relay device is located outside the air-gapped computing system and within range of the short-range wireless communication signals transmitted by the short-range wireless transceiver, wherein the relay device includes a second short-range wireless transceiver, and wherein there is no wired communication connection between any device located within the air-gapped computing system and any device located outside the air-gapped computing system. A destination node is also located outside the air-gapped computing system and connected to the relay device, wherein a service event detected by any of the plurality of nodes may be reported to the destination node by causing the first short-range wireless transceiver to transmit a service report identifying the service event to relay device for forwarding to the destination node.

DETAILED DESCRIPTION

Figure 1:
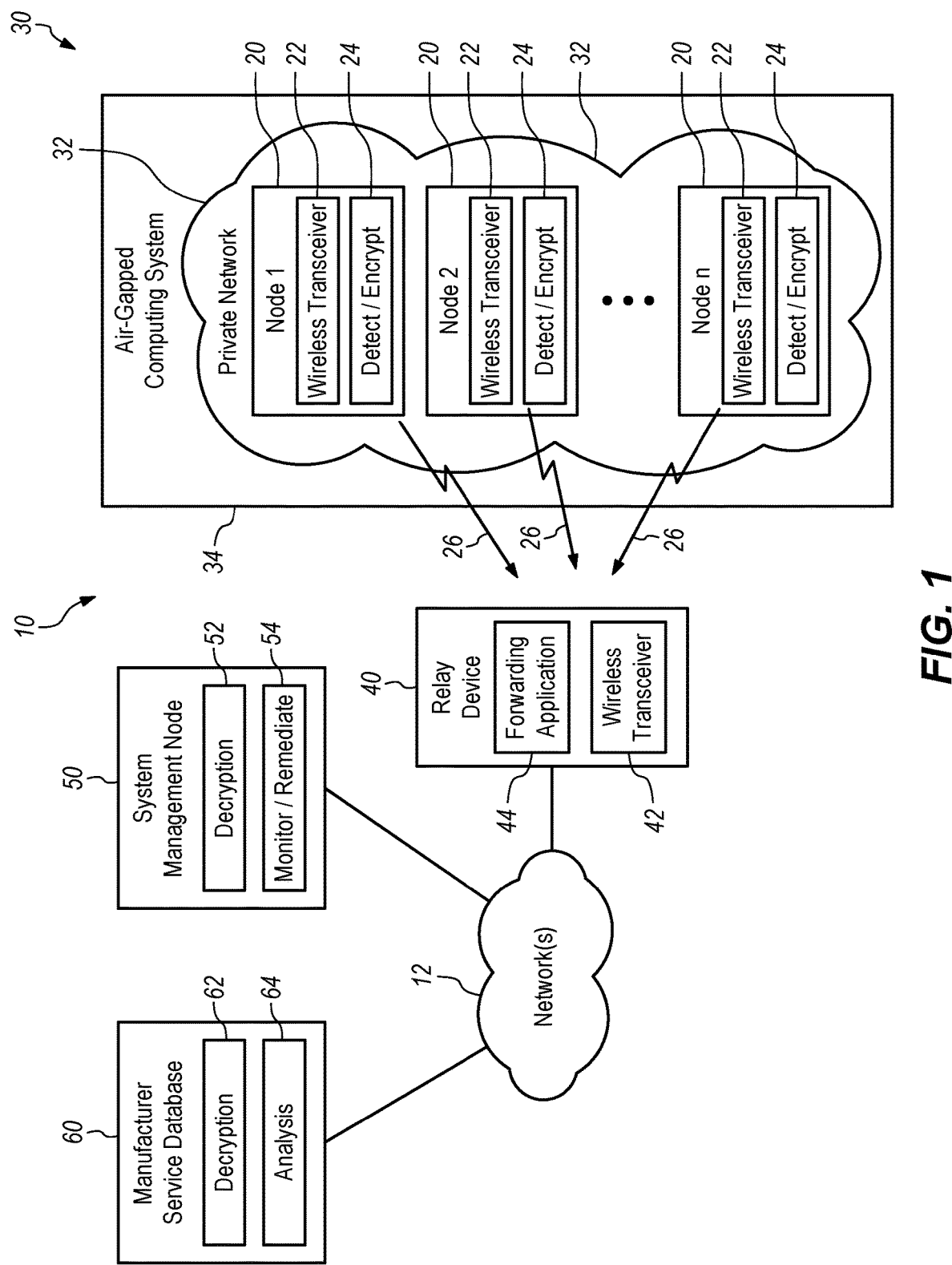
FIG. 1 is a diagram of a system including an air-gapped computing system including a plurality of nodes that transmit service reports in short-range wireless signals to a relay device located outside the air-gapped computing system.

Some embodiments provide a method comprising a node detecting that a service event has occurred within the node, wherein the node is located within an air-gapped computing system that includes a plurality of nodes, and wherein there is no wired communication connection between any device within the air-gapped computing system and any device outside the air-gapped computing system. The method further comprises a first wireless transceiver located within the air-gapped computing system transmitting a service report in a short-range wireless communication signal that extends beyond the air-gapped computing system, wherein the service report identifies the service event detected by the node. Still further, the method comprises a relay device located outside the air-gapped computing system receiving the short-range wireless communication signal that includes the service report, and the relay device forwarding the service report to a destination node located outside the air-gapped computing system.

The air-gapped computing system includes a plurality of nodes, which may include computing nodes such as servers, network switches, data storage nodes, other common types of computing equipment, and combinations thereof. Although the nodes in the air-gapped computing system have no wired communication connections beyond the air-gapped computing system itself, the air-gapped computing system may also be physically separated or isolated from other networks and may be located in a restricted area, such as a separate room which may be locked or otherwise secured.

The short-range wireless communication signals transmitted by the first wireless transceiver may preferably establish a one-way data transfer service or broadcast such that the plurality of nodes may report service events out of the air-gapped computing system but nodes or other entities outside the air-gapped computing system are unable to transmit messages into the air-gapped computing system. Without limitation, the short-range wireless communication may utilize the Bluetooth short-range wireless communication protocol and/or Wi-Fi wireless communication protocol. In some implementations, the Bluetooth protocol may be preferable to the Wi-Fi protocol because the range (distance) of signal transmission is shorter and there is less opportunity for the signal transmissions to be intercepted by an unauthorized device. For example, with some variations and exceptions, a typical Bluetooth signal may be limited to a range or distance of about 10 meters whereas a typical Wi-Fi signal may carry to a range or distance of about 100 meters. Accordingly, only devices having a Bluetooth receiver within 10 meters of a Bluetooth transmitter will be able to receive the Bluetooth short-range wireless communication. Wi-Fi may be used if the signal is isolated from other networks that extend beyond the location of the air-gapped equipment.

In some embodiments, the first wireless transceiver may implement a wireless protocol that causes the first wireless transceiver to operate in a transmit-only mode. Optionally, the transmit-only mode may permit limited bidirectional communication that supports the one-way data transfer service. For example, the first wireless transceiver (within the air-gapped computing system) may engage in a handshake with the second wireless transceiver and may receive responsive communications from the second wireless transceiver (outside the air-gapped computing system), such as acknowledgements of packets receipt without data loss to ensure reliable service report delivery and/or acknowledgement of relay device receipt of the service report to indicate that the service report has been forwarded and does not need to be further broadcast. In some implementations, the first wireless transceiver may only receive such responsive communications that support the one-way data transfer service. However, in other implementations, the first wireless transceiver may also be enabled to receive instructions from one or more authorized device, such as a destination node to which the service reports are being sent. Accordingly, the first wireless transceiver may receive instructions from the destination node to be forwarded to a node experiencing a service event, where the service event has been previously reported to the destination node in a service report.

The relay device may have various hardware configurations so long as it includes, or is connected to, a wireless transceiver and is able to host a forwarding application that causes the relay device to forward the service report to the destination node at a network location that is outside the range of the short-range wireless communication signal. In one example, the relay device may be a computing node having a wireless network interface (second wireless transceiver) that is compatible with the short-range wireless communication protocol being used by the first wireless transceiver located within the air-gapped computing system. Importantly, the relay device is located outside of the air-gapped computing system and has no wired connection to any component of the air-gapped computing system. However, the relay device must also be located within the signal range of the short-range wireless communication signal that is transmitted by the first wireless transceiver located within the air-gapped computing system and the relay device must utilize a second wireless transceiver that uses the same wireless communication protocol as the first wireless transceiver. In one option, the short-range wireless communication signal that includes the service report may also identify the destination node where the service report is to be forwarded. In another option, the relay device may run a forwarding application that is programmed with a set destination node for receiving all service reports, or service reports of one or more type. For example, the relay device may be a computing node that is programmed to identify the type or content of each service report, then forward each service report to one of several destination nodes according to the identified type or content of the service report. The relay device may be, without limitation, a smartphone, tablet computer, laptop computer, or other computer form factor that is able to host a forwarding application for forwarding the received data to the destination node at a network location that is outside the proximity of the air-gapped equipment. Without limitation, the destination nodes may include a system management node, such as a node running Lenovo XClarity Administrator, and/or a service database of a managed service provider, node manufacturer, or component manufacturer.

In some embodiments, the method may further comprise encrypting the service report prior to transmitting the service report. For example, the service report may be encrypted by the node experiencing and detecting the service event. The service report may be encrypted with a predetermined public encryption key that is paired with a private encryption key known only by the destination node. Still further, the method may include the destination node receiving the service report from the relay device and the destination node using the private encryption key to decrypt the service report. Alternatively, the service report could be decrypted by the relay device before forwarding the service report to the destination device.

In some embodiments, the service report may be encrypted by the node detecting the service event. For example, a computing node such as a server in the air-gapped computing system may detect a service event occurring with the computing node, prepare a service report to be sent to the destination node, and encrypt the service report before providing the encrypted service report to the first wireless transceiver for transmission in a short-range wireless communication signal. In one option, the destination node may be selected from a system management node that monitors operation of the plurality of nodes located within the air-gapped computing system and/or a service database operated by a manufacturer of the node that detected the service event. Accordingly, the method may further comprise the node encrypting the service report using a first predetermined public encryption key that is paired with a first private encryption key that is only known by the service database to form a first encrypted service report, and the node encrypting the first encrypted service report using a second predetermined public encryption key that is paired with a second private encryption key that is only known by the system management node to form a second encrypted service report, wherein the first wireless transceiver transmits the second encrypted service report in the short-range wireless communication signal that extends beyond the air-gapped computing system. Subsequently, the system management node receives the second encrypted service report, decrypts the second encrypted service report using the second private encryption key to obtain the first encrypted service report, and forwards the first encrypted service report to the service database.

In some embodiments, the method may further comprise the node determining whether the service report is to be sent to the system management node or the service database. In response to determining that the service report is to be sent to the service database, the node may encrypt the service report using a first predetermined public encryption key that is paired with a first private encryption key that is only known by the service database to form a first encrypted service report that is transmitted by the first wireless transceiver. In response to determining that the service report is to be sent to the system management node, the node may encrypt the service report using a second predetermined public encryption key that is paired with a second private encryption key that is only known by the system management node to form a second encrypted service report that is transmitted by the first wireless transceiver. Accordingly, the service database and the system management node have the appropriate private encryption key that is needed to decrypt the encrypted service reports that are sent to them.

In some embodiments, the destination node is a system management node that monitors the operation of the plurality of nodes located within the air-gapped computing system. After the system management node receives the service report, the method may further comprise the system management node identifying an instruction for remediating the service event. The relay device located outside of the air-gapped computing system may be used to transmit the instruction in a second short-range wireless communication signal that extends into the air-gapped computing system. A data aggregator located within the air-gapped computing system may receive the second short-range wireless communication signal that includes the instruction, and the data aggregator may forward the instruction to the node located within the air-gapped computing system. Alternatively, if a data aggregator is not being used, then the individual node may receive the second short-range wireless communication signal that includes the instruction. The method may optionally further comprise encrypting the instruction prior to transmitting the instruction, wherein the instruction is encrypted with a predetermined public encryption key that is paired with a private encryption key known only by the data aggregator and/or the node within the air-gapped computing system. Some service events experienced by a node may require a service operation in the form of a hardware replacement, firmware upgrade, reset, and the like that require an IT professional to physically enter the air gapped environment to affect the service. However, in other circumstances, the required service operation can be affected with restricted network access. Accordingly, some embodiments may include a wireless airgap in the opposite direction (i.e., from a wireless transceiver of the relay device outside the air-gapped environment to a wireless transceiver of the data aggregator or node within the air-gapped environment) so that remediation instructions can be delivered back to the node. Preferably, any communication transmitted into the air-gapped environment may be required to use a pre-configuration of trust (encryption key pair, for example) between the system management node and the node experiencing the service event in the air-gapped environment.

In some embodiments, the first wireless transceiver may be a component of the node detecting the service event. For example, the node may include a wireless network interface card that includes a wireless transceiver that uses a short-range wireless communication protocol, such as Bluetooth or Wi-Fi. In one option, the node is a server including a baseboard management controller, wherein the baseboard management controller instructs the wireless transceiver to transmit the service report. Alternatively, the wireless transceiver may be a peripheral device directly connected to the node. In another option, each of the plurality of nodes includes their own wireless transceiver for communicating with the relay device outside the air-gapped computing system. However, any wireless transceiver within the air-gapped computing system should operate in a mode that restricts the types and sources of wireless communications that may be received.

In some embodiments, the air-gapped computing system may include one or more wireless transceivers that are controlled by, or included in, one or more data aggregator devices within the air-gapped computing system. A data aggregator device receives the service report from the node detecting the service event over a private network within the air-gapped computing system and uses the wireless transceiver to transmit the service report. In a preferred option, the data aggregator device(s) may be connected to receive service reports from any of the plurality of nodes in the air-gapped computing system and use the wireless transceiver to transmit the service reports in short-range wireless communication signals to be received by one or more relay device outside the air-gapped computing system. In one option, the data aggregator device may be a computing node that includes or is directly connected to the wireless transceiver.

Some embodiments provide a system comprising a plurality of nodes located within an air-gapped computing system. The system further comprises a first short-range wireless transceiver located within the air-gapped computing system and connected for communication with the plurality of nodes, wherein the first wireless transceiver transmits short-range wireless communication signals that extend beyond the air-gapped computing system. A relay device is located outside the air-gapped computing system and within range of the short-range wireless communication signals transmitted by the first short-range wireless transceiver, wherein the relay device includes a second short-range wireless transceiver, and wherein there is no wired communication connection between any device located within the air-gapped computing system and any device located outside the air-gapped computing system. A destination node is also located outside the air-gapped computing system and connected to the relay device, wherein a service event detected by any of the plurality of nodes may be reported to the destination node by causing the first short-range wireless transceiver to transmit a service report identifying the service event to relay device for forwarding to the destination node.

The system embodiments may implement any entity, component, operation or aspect described in reference to any one of the method embodiments. Similarly, the method embodiments may implement any entity, component, operation or aspect of any of the system embodiments. Furthermore, the operations of any of the method embodiments may be implemented as program instructions that, when executed by a processor, would cause the processor to implement or initiate any one or more aspects of the methods described herein.

FIG. 1 is a diagram of a system 10 including a plurality of nodes 20 (some number n of nodes greater than one) located within an air-gapped computing system 30. The nodes may, without limitation, be selected from servers, data storage devices and/or network switches. Each node 20 may communicate with any of the other nodes 20 within the air-gapped computing system 30 over a private network 32 that has no wired connection with any device outside of the air-gapped computing system 30. Each of the plurality of nodes 20 includes their own wireless transceiver 22 for communicating with a relay device 40 located outside the air-gapped computing system. Specifically, each wireless transceiver 22 may transmit service reports in short-range wireless communication signals to the relay device 40 without any wired connection there between. Furthermore, the wireless transceiver 22 of each node 20 may establish a one-way transfer of the service report out of the air-gapped computing system and operate in a transmit-only mode but may still receive responsive communications in support of the one-way communication, such as handshakes and message acknowledgements. Each node also includes an application module 24 that detects service events occurring within the node, forms a service report including identification of the service event, and may optionally encrypt the service report before causing the wireless transmitter 20 to transmit the service report in a short-range wireless communication signal.

The wireless transceivers 22 transmit short-range wireless communication signals that extend beyond a boundary 34 of the air-gapped computing system 30. In one option, the boundary 34 may be the walls of a room that isolate and protect the air-gapped computing system 30. A relay device 40 is located outside the air-gapped computing system 30 and within range of the short-range wireless communication signals 26 that may be transmitted by the short-range wireless transceivers 22. Notice that there is no wired communication connection between any device located within the air-gapped computing system 30 and any device located outside the air-gapped computing system 30. This safeguards the operation and data of the air-gapped computing system 30 since no entity outside the air-gapped computing system 30 can gain access. While the wireless transceivers 22 support sending information out from the air-gapped computing system 30, only service data that the nodes are pre-programmed to report will leave the air-gapped computing system 30.

The relay device 40 includes a second short-range wireless transceiver 42 and a forwarding application 44. The second short-range wireless transceiver 42 should use the same short-range wireless communication protocol as the first wireless transceiver 22 and should provide the received service reports to the forwarding application 44. The forwarding application 44 will forward the service reports to a destination node that is also located outside the air-gapped computing system and connected to the relay device via one or more networks 12.

The destination node may be a system management node 50 hosting a system management application. The system management application may include a decryption module 52 that can decrypt any encrypted service reports and a monitoring/remediating module 54 that receives and responds to the service reports. For example, the system management node 50 may respond to a service report by notifying personnel about the condition of a node 20 and/or identify service that needs to be performed on the node 20.

Furthermore, the destination node may be a manufacturer service database 60 including a decryption module 62 and a service report analysis module 64. Accordingly, the manufacturer service database 60 is able to decrypt certain service reports that are directed to the manufacturer service database 60 and analyze the condition of the node 20 sending the service report.

Figure 2:
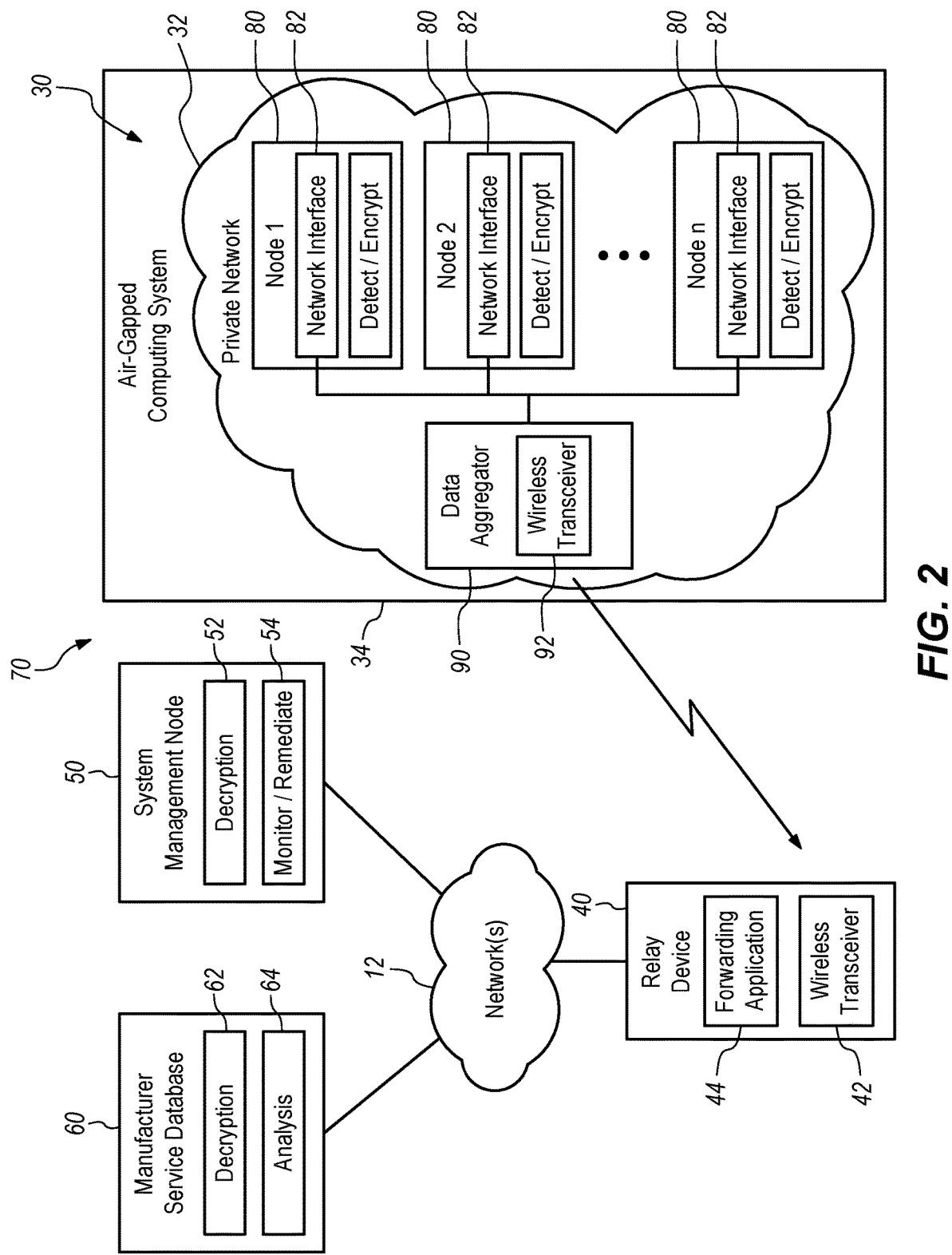
FIG. 2 is a diagram of a system including an air-gapped computing system including a plurality of nodes and a data aggregator that receives service reports from the nodes and transmits the service reports in short-range wireless signals to a relay device located outside the air-gapped computing system.

FIG. 2 is a diagram of a system 70 including an air-gapped computing system 30 including a plurality of nodes 80 and a data aggregator 90 that receives service reports from the nodes 80 and transmits the service reports in short-range wireless signals to the relay device 40 located outside the air-gapped computing system.

The air-gapped computing system 30 in FIG. 2 is similar to that in FIG. 1, except that the system 30 includes the data aggregator 90. The data aggregator 90 includes and controls a wireless transceiver 92 and communicates with each of the plurality of nodes 80. In system 10 of FIG. 1, each node 20 has its own wireless transceiver 22 for transmitting a service report to the relay device 40. However, the nodes 80 in system 70 each include a network interface 82 that sends service reports over the private network 32 to the data aggregator device 90. Whenever the data aggregator device 90 receives a service report from one of the nodes 80 within the air-gapped computing system 30, the data aggregator 90 uses the wireless transceiver 92 to transmit a short-range wireless communication signal containing the service report.

Figure 3:
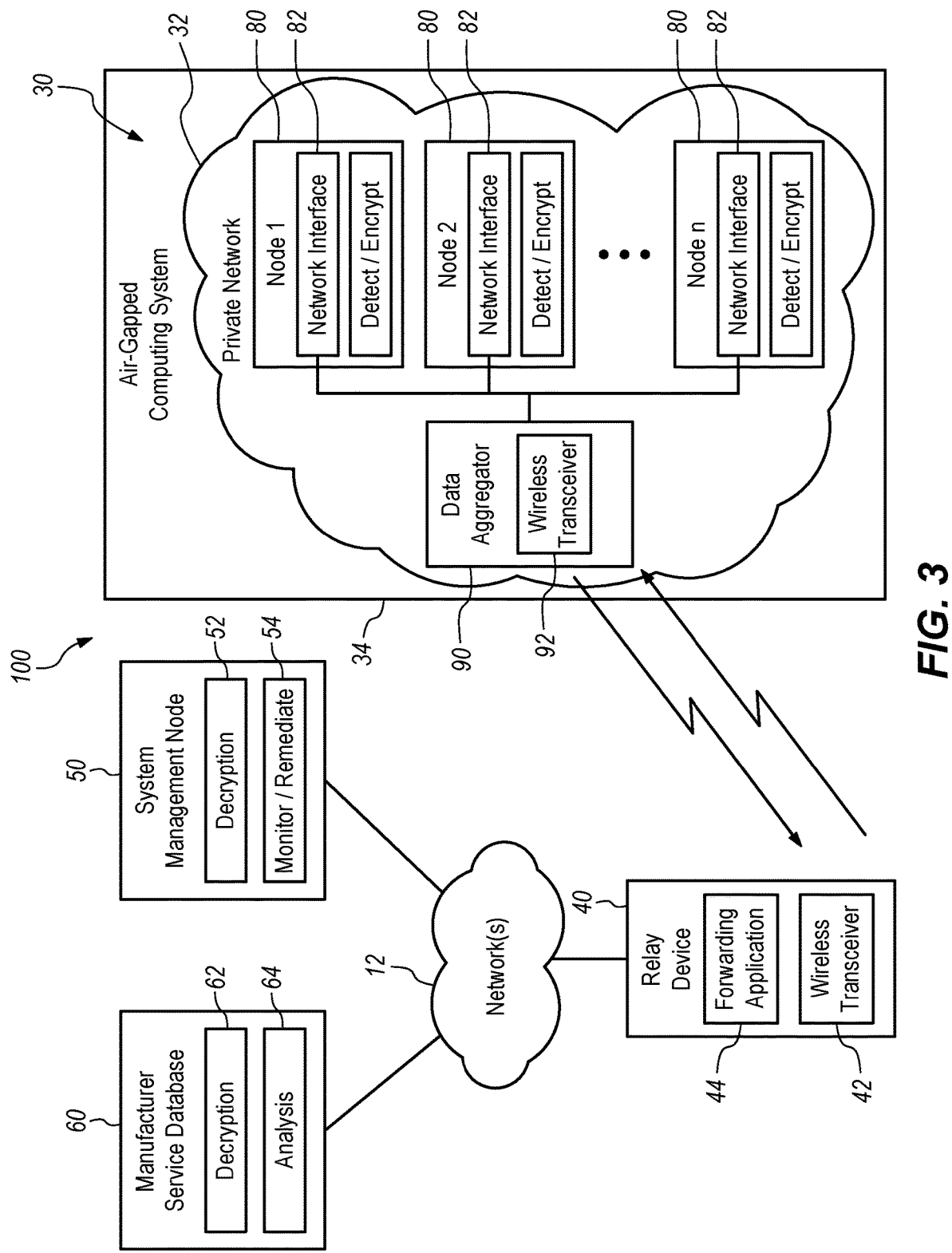
FIG. 3 is a diagram of a system including an air-gapped computing system including a plurality of nodes, a data aggregator for transmitting service reports from the nodes in short-range wireless signals to a first relay device located outside the air-gapped computing system, wherein the relay device may also transmit instructions from a system management node outside the air-gapped computing system to the data aggregator inside the air-gapped computing system.

FIG. 3 is a diagram of a system 100 including an air-gapped computing system 30 including a plurality of nodes 80 and a data aggregator 90 for transmitting service reports from the nodes 80 in short-range wireless signals to a first relay device 40 located outside the air-gapped computing system 30. However, the relay device 40 may also use its wireless transceiver 42 to send instructions to the data aggregator 90 for forwarding to the nodes 80 within the air-gapped computing system 30. For example, it may be preferable to send instructions via the relay device 40 and data aggregator 90 than to send personnel into the protected area 34 where the air-gapped computing system 30 is located. Sending a person into the protected area 34 to access the air-gapped computing system 30 exposes the system 30 to risks of introducing malicious code or removing valuable data, etc. and it may be preferable to minimize entry into the protected area 34.

In one example, the system management node 50 may monitor operation of the plurality of nodes 80 located within the air-gapped computing system 30, including the receipt of service reports from the nodes 80 via the data aggregator 90 and relay device 40. However, the system management node 50 may also identify an instruction for remediating the service event identified in a service report. Accordingly, the system management node 50 may cause the second wireless transceiver 42 associated with the relay device 40 located outside of the air-gapped computing system to transmit the instruction in a second short-range wireless communication signal that extends into the air-gapped computing system 30. The data aggregator 90 located within the air-gapped computing system 30 then receives the second short-range wireless communication signal that includes the instruction and forwards the instruction to one of the nodes 80 located within the air-gapped computing system via the private network 32. Optionally, the system management node 50 may encrypt the instruction prior to transmitting the instruction. For example, the instruction may be encrypted with a predetermined public encryption key that is paired with a private encryption key known only by the data aggregator and/or the node within the air-gapped computing system.

Figure 4:
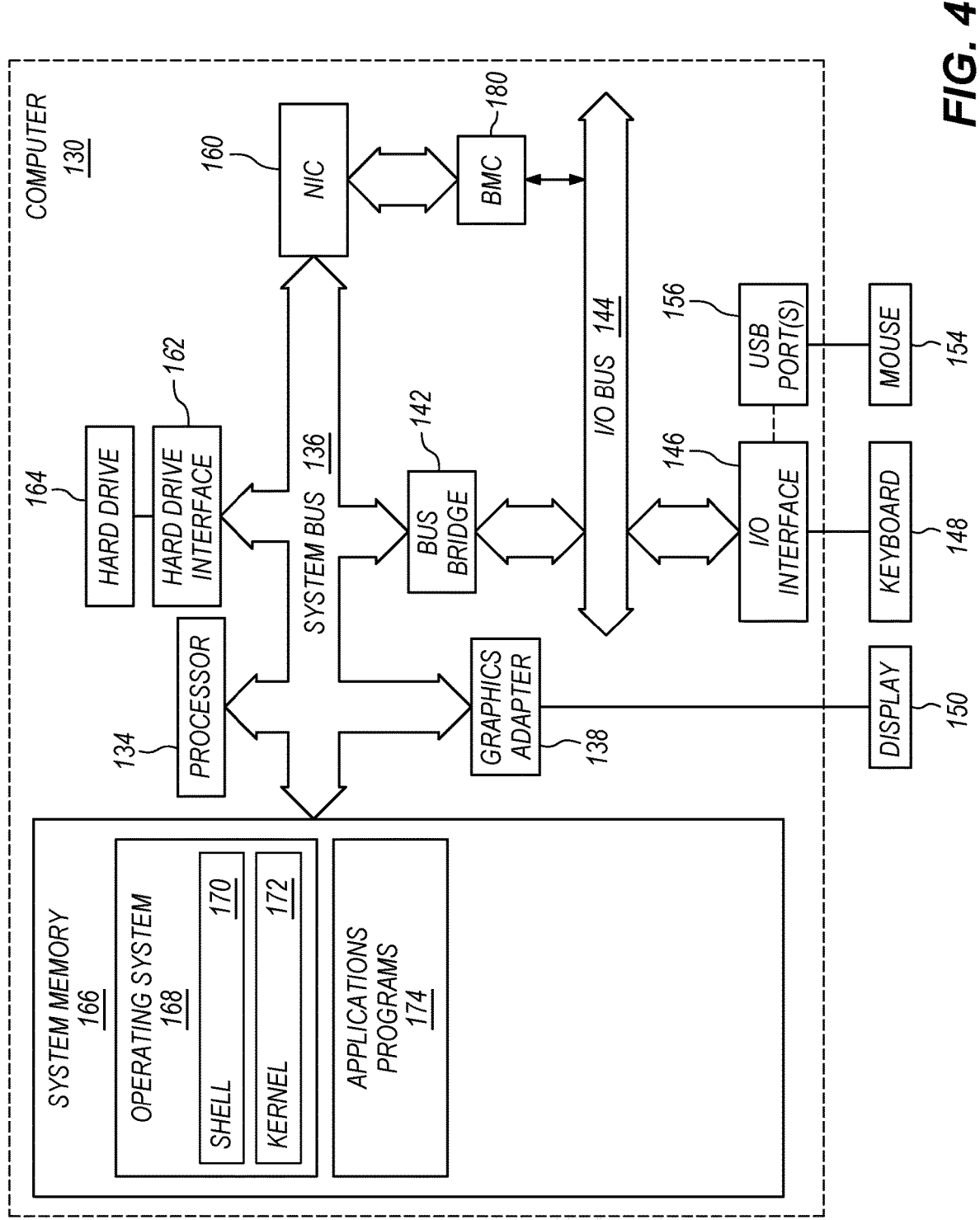
FIG. 4 is a diagram of one embodiment of a computer.

FIG. 4 is a diagram of one embodiment of a computer 130 that may be representative, but not limiting, of one or more aspect of the configuration of the node 20 (FIG. 1), the node 80 (FIGS. 2-3), the system management node 50 (FIGS. 1-3), the manufacturer service database 60 (FIGS. 1-3), the data aggregator 90 (FIGS. 2-3), and/or the relay device 40 (FIGS. 1-3).

The computer 130 includes a processor unit 134 that is coupled to a system bus 136. The processor unit 134 may utilize one or more processors, each of which has one or more processor cores. A graphics adapter 138, which drives/supports the display 150, is also coupled to system bus 136. The graphics adapter 138 may, for example, include a graphics processing unit (GPU). The system bus 136 is coupled via a bus bridge 142 to an input/output (I/O) bus 144. An I/O interface 146 is coupled to the I/O bus 144. The I/O interface 146 affords communication with various I/O devices, such as a keyboard 148 (perhaps as a touch screen virtual keyboard), and a USB mouse 154 via USB port(s) 156 (or other type of pointing device, such as a trackpad). The I/O bus 144 may also provide communication to a baseboard management controller (BMC) 180. As depicted, the computer 130 may include a network adapter or network interface controller (NIC) 160 which, depending upon the embodiment, may include a wireless transmitter (without a wireless receiver), a wireless receiver (preferably without a wireless transmitter), and/or a wired network connection (i.e., Ethernet) to support communicate with other devices as specifically described above in reference to particular embodiments. The hardware elements depicted in the computer 130 are not intended to be exhaustive, but rather are representative. For instance, the computer 130 may include non-volatile memory and the like.

A hard drive interface 162 is also coupled to the system bus 136. The hard drive interface 162 interfaces with a hard drive 164. In a preferred embodiment, the hard drive 164 communicates with system memory 166, which is also coupled to the system bus 136. System memory is defined as the lowest level of volatile memory in the computer 130. This volatile memory may include additional higher levels of volatile memory (not shown), including, but not limited to, cache memory, registers and buffers. Data that populates the system memory 166 may include an operating system (OS) 168 and application programs 174. In one example, where the computer 130 implements one of the nodes 20, 80, the application programs may include a service event detection and service report encryption program. In another example, where the computer 130 implements the relay device 40, the application programs may include a forwarding application.

The operating system 168 includes a shell 170 for providing transparent user access to resources such as application programs 174. Generally, the shell 170 is a program that provides an interpreter and an interface between the user and the operating system. More specifically, the shell 170 executes commands that are entered into a command line user interface or from a file. Thus, the shell 170, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 172) for processing. Note that while the shell 170 may be a text-based, line-oriented user interface, embodiments may support other user interface modes, such as graphical, voice, gestural, etc.

As depicted, the operating system 168 also includes the kernel 172, which may include lower levels of functionality for the operating system 168, including providing essential services required by other parts of the operating system 168 and application programs 174. Such essential services may include memory management, process and task management, disk management, and mouse and keyboard management. As shown, the computer 130 includes application programs 174 in the system memory of the computer 130.

Optionally, the computer 130 may further include a baseboard management controller (BMC) 180. The BMC may be used to perform out-of-band processing and may monitor and manage various features of the hardware components of the computer. Furthermore, the BMC 180 may provide certain service reports to the network interface controller 160 or other wireless transmitter for transmitting a short-range wireless communication signal including a service report.

Figure 5:
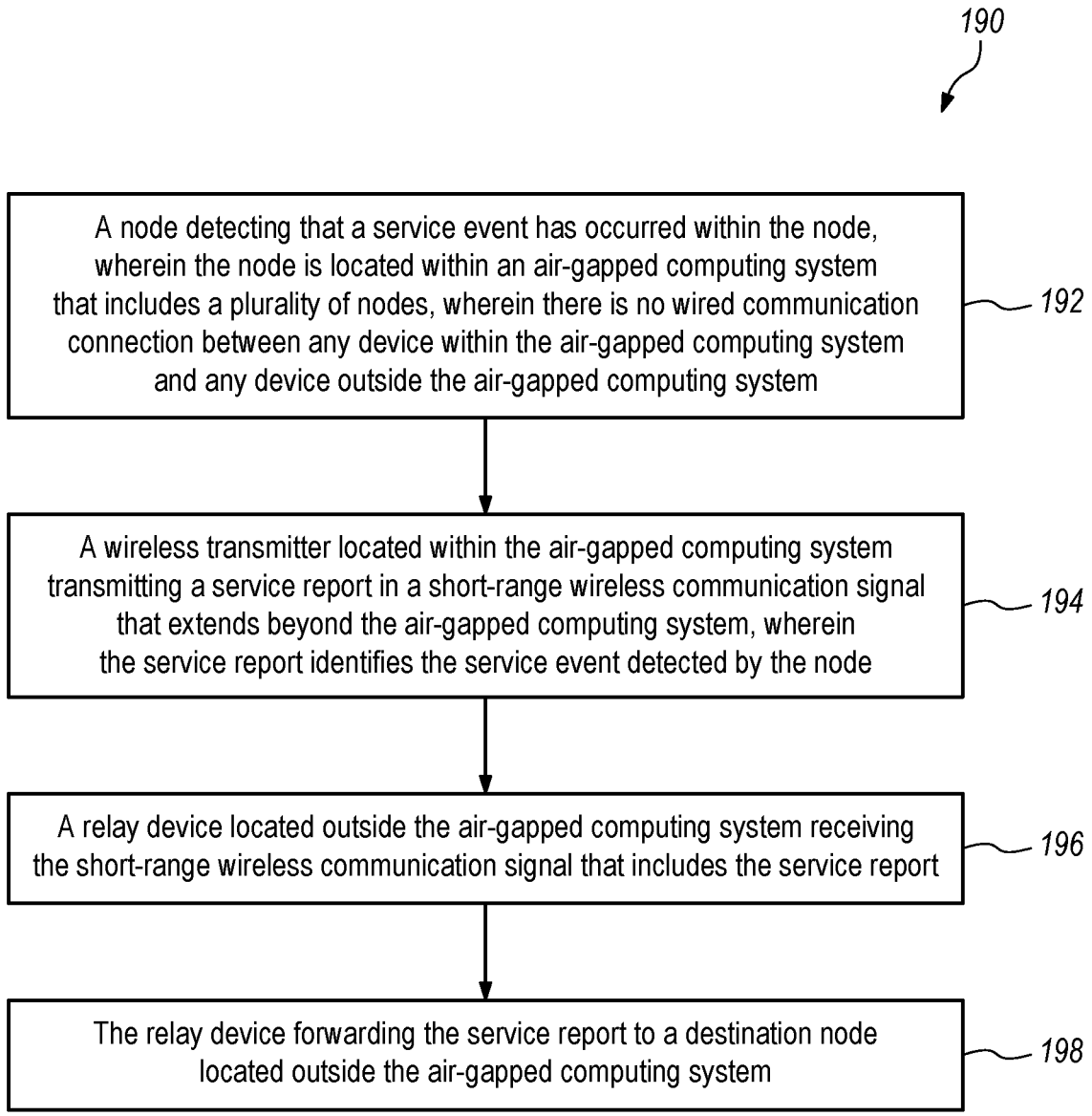
FIG. 5 is a flowchart of operations for communicating a service report from a node located within the air-gapped computing system to a destination node located outside the air-gapped computing system.

FIG. 5 is a flowchart of operations 190 for communicating a service report from a node located within the air-gapped computing system to a destination node located outside the air-gapped computing system according to some method or computer program product embodiments. Operation 192 includes a node detecting that a service event has occurred within the node, wherein the node is located within an air-gapped computing system that includes a plurality of nodes, wherein there is no wired communication connection between any device within the air-gapped computing system and any device outside the air-gapped computing system. Operation 194 includes a wireless transmitter located within the air-gapped computing system transmitting a service report in a short-range wireless communication signal that extends beyond the air-gapped computing system, wherein the service report identifies the service event detected by the node. Operation 196 includes a relay device located outside the air-gapped computing system receiving the short-range wireless communication signal that includes the service report. Operation 198 includes the relay device forwarding the service report to a destination node located outside the air-gapped computing system.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
a node detecting that a service event has occurred within the node, wherein the node is located within an air-gapped computing system that includes a plurality of nodes, wherein each of the plurality of nodes includes their own wireless transceiver for communicating with a relay device located outside the air-gapped computing system, and wherein there is no wired communication connection between any device within the air-gapped computing system and any device outside the air-gapped computing system;
a first wireless transceiver located within the air-gapped computing system transmitting a service report in a short-range wireless communication signal that extends beyond the air-gapped computing system, wherein the service report identifies the service event detected by the node;

the relay device located outside the air-gapped computing system receiving the short-range wireless communication signal that includes the service report; and
the relay device forwarding the service report to a destination node located outside the air-gapped computing system.

2. The method of claim 1, wherein the relay device is a computing device that is connected to a second wireless transceiver and hosts a forwarding application that causes the relay device to forward the service report to the destination node at a network location that is outside the range of the short-range wireless communication signal.

3. The method of claim 1, further comprising:
encrypting the service report prior to transmitting the service report, wherein the service report is encrypted with a predetermined public encryption key that is paired with a private encryption key known only by the destination node;
the destination node receiving the service report from the relay device; and
the destination node using the private encryption key to decrypt the service report.

4. The method of claim 3, wherein the service report is encrypted by the node detecting the service event.

5. The method of claim 4, wherein the destination node is selected from a system management node that monitors operation of the plurality of nodes located within the air-gapped computing system and/or a service database operated by a manufacturer of the node that detected the service event, the method further comprising:
the node encrypting the service report using a first predetermined public encryption key that is paired with a first private encryption key that is only known by the service database to form a first encrypted service report; and
the node encrypting the first encrypted service report using a second predetermined public encryption key that is paired with a second private encryption key that is only known by the system management node to form a second encrypted service report, wherein the first wireless transceiver transmits the second encrypted service report in the short-range wireless communication signal that extends beyond the air-gapped computing system.

6. The method of claim 5, further comprising:
the system management node receiving the second encrypted service report;
the system management node decrypting the second encrypted service report using the second private encryption key to obtain the first encrypted service report; and
the system management node forwarding the first encrypted service report to the service database.

7. The method of claim 4, wherein the destination node is selected from a system management node that monitors operation of the plurality of nodes located within the air-gapped computing system and/or a service database operated by a manufacturer of the node that detected the service event, the method further comprising:
the node determining whether the service report is to be sent to the system management node or the service database;
the node, in response to determining that the service report is to be sent to the service database, encrypting the service report using a first predetermined public encryption key that is paired with a first private encryption key that is only known by the service database to form a first encrypted service report that is transmitted by the first wireless transceiver; and
the node, in response to determining that the service report is to be sent to the system management node, encrypting the service report using a second predetermined public encryption key that is paired with a second private encryption key that is only known by the system management node to form a second encrypted service report that is transmitted by the first wireless transceiver.

8. The method of claim 1, wherein the destination node is a system management node that monitors operation of the plurality of nodes located within the air-gapped computing system.

9. The method of claim 1, wherein the destination node is a service database operated by a manufacturer of the node that detected the service event.

10. The method of claim 1, wherein the short-range wireless communication is selected from Bluetooth wireless communication and/or Wi-Fi wireless communication.

11. The method of claim 1, wherein the first wireless transceiver is a component of the node detecting the service event.

12. The method of claim 11, wherein the node is selected from a server, data storage device, and network switch.

13. The method of claim 11, wherein the node is a server including a baseboard management controller, and wherein the baseboard management controller instructs the first wireless transceiver to transmit the service report.

14. A method, comprising:
a node detecting that a service event has occurred within the node, wherein the node is located within an air-gapped computing system that includes a plurality of nodes, and wherein there is no wired communication connection between any device within the air-gapped computing system and any device outside the air-gapped computing system;
a first wireless transceiver located within the air-gapped computing system transmitting a service report in a short-range wireless communication signal that extends beyond the air-gapped computing system, wherein the service report identifies the service event detected by the node;
a relay device located outside the air-gapped computing system receiving the short-range wireless communication signal that includes the service report;
the relay device forwarding the service report to a system management node located outside the air-gapped computing system, wherein the system management node monitors operation of the plurality of nodes located within the air-gapped computing system;
the system management node identifying an instruction for remediating the service event;
the relay device using a second wireless transceiver located outside of the air-gapped computing system to transmit the instruction from the system management node in a second short-range wireless communication signal that extends into the air-gapped computing system;
a data aggregator located within the air-gapped computing system using the first wireless transceiver to receive the second short-range wireless communication signal that includes the instruction; and
the data aggregator forwarding the instruction to the node located within the air-gapped computing system.

15. The method of claim 14, further comprising:
encrypting the instruction prior to transmitting the instruction, wherein the instruction is encrypted with a predetermined public encryption key that is paired with a private encryption key known only by the data aggregator and/or the node within the air-gapped computing system.

16. The method of claim 14, wherein the data aggregator is connected to receive service reports from any of the plurality of nodes in the air-gapped computing system and use the first wireless transceiver to transmit the service reports in short-range wireless communication signals to be received by the relay device.

17. The method of claim 16, wherein none of the plurality of nodes include a wireless transceiver.

18. A method, comprising:
a node detecting that a service event has occurred within the node, wherein the node is located within an air-gapped computing system that includes a plurality of nodes, and wherein there is no wired communication connection between any device within the air-gapped computing system and any device outside the air-gapped computing system;
a first wireless transceiver located within the air-gapped computing system transmitting a service report in a short-range wireless communication signal that extends beyond the air-gapped computing system, wherein the service report identifies the service event detected by the node;
a relay device located outside the air-gapped computing system receiving the short-range wireless communication signal that includes the service report; and
the relay device forwarding the service report to a destination node located outside the air-gapped computing system, wherein the first wireless transceiver is controlled by a data aggregator device within the air-gapped computing system, wherein the data aggregator device receives the service report from the node detecting the service event over a private network within the air-gapped computing system and uses the first wireless transceiver to transmit the service report.

19. The method of claim 18, wherein the data aggregator is connected to receive service reports from any of the plurality of nodes in the air-gapped computing system and use the first wireless transceiver to transmit the service reports in short-range wireless communication signals to be received by the relay device.

20. The method of claim 19, wherein none of the plurality of nodes include a wireless transceiver.

* * * * *